US006856621B1

(12) United States Patent
Artes

(10) Patent No.: US 6,856,621 B1
(45) Date of Patent: Feb. 15, 2005

(54) METHOD OF TRANSMISSION OF DATA IN CLUSTER ENVIRONMENT

(75) Inventor: Jari Artes, Helsinki (FI)

(73) Assignee: Stonesoft Oy, Helsinki (FI)

( * ) Notice: Subject to any disclaimer, the term of this patent is extended or adjusted under 35 U.S.C. 154(b) by 803 days.

(21) Appl. No.: 09/686,273

(22) Filed: Oct. 10, 2000

(30) Foreign Application Priority Data

Oct. 11, 1999 (FI) .............................................. 19992188

(51) Int. Cl.[7] .............................................. H04L 12/28
(52) U.S. Cl. ...................... 370/390; 370/401; 709/232; 709/238
(58) Field of Search ................................ 370/351, 357, 370/389, 390, 360, 396, 400, 401, 463; 709/200, 230, 232, 238

(56) References Cited

U.S. PATENT DOCUMENTS

| | | | | |
|---|---|---|---|---|
| 5,818,838 A | * | 10/1998 | Backes et al. | 370/390 |
| 5,920,566 A | * | 7/1999 | Hendel et al. | 370/401 |
| 5,930,259 A | * | 7/1999 | Katsube et al. | 370/409 |
| 6,216,167 B1 | * | 4/2001 | Momirov | 709/238 |
| 6,317,434 B1 | * | 11/2001 | Deng | 370/432 |
| 6,370,142 B1 | * | 4/2002 | Pitcher et al. | 370/390 |
| 6,553,028 B1 | * | 4/2003 | Tang et al. | 370/389 |
| 6,614,787 B1 | * | 9/2003 | Jain et al. | 370/390 |

FOREIGN PATENT DOCUMENTS

| | | |
|---|---|---|
| EP | 0 865 180 A | 9/1998 |
| WO | 99 3327 A | 7/1999 |
| WO | WO 99/37061 A | 7/1999 |

* cited by examiner

Primary Examiner—John Pezzlo
Assistant Examiner—Dmitry Levitan
(74) Attorney, Agent, or Firm—Ronald Craig Fish, A Law Corp.

(57) ABSTRACT

The invention relates to methods for transmission of data, more particularly for transmission of data in clustered structures in IP networks. According to the invention, the cluster units are configured to be members of an IP multicast group specific to the cluster. The switch or switches directly connected to the cluster units are arranged to monitor multicast group membership reports from the cluster units, and therefore obtain knowledge about which ports of the switch or switches are connected to cluster units. Advantageously, the switch or switches may also send membership queries to find out, which ports are connected to members of the cluster multicast group. Consequently, when the switch receives a packet with a multicast MAC address and the IP address of the cluster, the switch sends the packet to only those ports to which cluster units are connected, and not to all ports of the switch as according to the prior art.

22 Claims, 5 Drawing Sheets

METHOD OF TRANSMISSION OF DATA IN CLUSTER ENVIRONMENT

BACKGROUND OF THE INVENTION

1. Field of the Invention

The invention relates to methods for transmission of data, more particularly for transmission of data in clustered structures in IP networks. Especially, the invention is related to such a method as specified in the preamble of the independent method claim.

2. Description of Related Art

A gateway is typically understood as a device, which connects a first network to a second network. A server is typically understood as a device, which receives requests from a client, performs the requested act and sends results back to the client. Typically, a gateway is used to connect the local area network (LAN) of a company to the public Internet. The gateway typically acts as a firewall, i.e. screens incoming traffic according to a certain set of rules to protect the local area network and data stored therein. Servers provide services to individual computers within the local area network, such as database services, disk services, and so on.

Gateway clusters and server clusters are used, when the capacity of a single device is not sufficient. Compared to a single device, gateway or server clusters provide high availability and increased throughput. FIG. 1 illustrates the structure of a gateway cluster. FIG. 1 shows client computers 10 connected to a switch 20. The client computers 10, the switch 20, and form a local area network (LAN). The LAN is connected to an external network 50 through a gateway cluster consisting in this example of five gateways 30. The gateways 30 may for example function as firewall devices. The gateways 30 are connected to the external network 50 through a switch 20 and a router 40. The client computers are in FIG. 1 divided into three subnetworks A, B, and C.

FIG. 2 illustrates a server cluster. FIG. 2 shows client computers 10 connected to a switch 20, which together form a local area network (LAN). The switch connects the local area network to the server cluster, which in this example comprises five server computers 30. FIG. 2 further illustrates mass storage units 60 connected to the server computers 30. The client computers are in FIG. 2 divided into three subnetworks A, B, and C.

In general, there are two basic methods to construct server and gateway clusters in a TCP/P network. According to the first basic method, each server or gateway has a distinct P address, and an external device redirects the requests or packets to different servers or gateways. The external device has a certain set of rules for controlling the redirection of data packets. For example, the external device can redirect data packets on the basis of current load on the cluster devices. In the example of FIGS. 1 and 2, the external device can be the switch 20 connecting the LAN to the cluster. The main drawback of this solution is asymmetric routing: because routing in P networks is usually based only on the destination P address, outgoing and incoming packets can be routed to different gateways. This is a problem when the gateways also serve as firewalls, since firewalls typically do not accept any incoming messages, which are not a reply to a previous outgoing request. When the incoming packets are routed to a second gateway which is a different gateway than the first gateway which sent the original outgoing request, they will be discarded since the second gateway does has no knowledge about the previous request.

According to the second basic method, all units of the cluster share a common IP address and MAC (media access control) address, and therefore receive all traffic in both directions. The units of the cluster have filter functions at their inputs and outputs, which according to certain rules allow the processing of a packet by only one of the gateways, while the others ignore the packet. The rules are constructed in such a way that the same gateway processes the packets in both directions of a single connection, which allows normal firewall operation. The benefit of this solution is transparency and scalability. New servers or gateways can be added to the cluster without changing routing, i.e. unnoticed by the clients.

However, even the second basic method has its drawbacks. Connecting multiple servers or gateways sharing a common MAC address to a switch requires usually usage of a multicast MAC address for the cluster, i.e. a hardware layer address which is recognized and processed by the network interface of every unit of the cluster. The network interfaces of the gateways always have individual MAC addresses as well, but in this solution, the interfaces are arranged to recognize the multicast MAC address selected for the cluster. The IP address of the server or gateway cluster is mapped to a multicast MAC address in the ARP (Address Resolution Protocol) tables of the nodes of the IP network. When a client wishes to send a data packet to the cluster, it addresses the packet to the IP address of the cluster. The network translates the IP address to a MAC address for transportation on the physical layer, and in this case the MAC address is a multicast address. The problem with multicast MAC addresses is that switches typically flood packets having a multicast address as destination to all ports of the switch by default, wherefore the packet ends up in all other subnetworks connected to other ports of the switch. This effect causes an unnecessary loading of other subnetworks connected to other ports of the switch than the gateways/servers of the cluster. This is a severe problem, if the LAN is divided into virtual LAN networks (VLAN).

Virtual LANs (VLAN) can be created using switches to segment networks. A single segment is a broadcast domain, i.e. broadcast, multicast and unknown unicast frames are sent to all stations in the segment. Port-based virtual LAN networks are groups of switch ports and attached segments (subnetworks) which belong to the VLAN.

SUMMARY OF THE INVENTION

An object of the invention is to realize a method for transmission of data in an IP packet network, which avoids the problems of the prior art.

The objects are reached by using the IGMP protocol to inform the switch, which of its ports are connected to units of a cluster system, and forwarding those packets with the unicast IP address of the cluster system and the multicast MAC address of the cluster system only to those ports.

The method according to the invention is characterized by that, which is specified in the independent method claim. The cluster system according to the invention is characterized by that, which is specified in the independent claim directed to a cluster system. The dependent claims describe further advantageous embodiments of the invention.

The invention is applicable to gateway clusters as well as server clusters. In the following, the single unit of cluster i.e. a gateway or a server is denoted a cluster unit.

According to the invention, the cluster units are configured to be members of an IP multicast group specific to the cluster. The switch or switches directly connected to the cluster units are arranged to monitor multicast group membership reports from the cluster units, and therefore obtain knowledge about which ports of the switch or switches are connected to cluster units. Advantageously, the switch or switches may also send membership queries to find out, which ports are connected to members of the cluster multicast group. Consequently, when the switch receives a packet with a multicast MAC address and the unicast IP address of the cluster, the switch sends the packet to only those ports to which cluster units are connected, and not to all ports of the switch as according to the prior art. In the local area network, the unicast IP address of the cluster is mapped to a multicast MAC address in the routing tables in the network. Therefore, when any client sends a packet to the cluster, the switch will receive the packet with a multicast MAC destination address.

For obtaining this functionality, the switch is arranged to recognize the unicast IP address of the cluster and the multicast group address configured for the cluster, and to store into its memory information about which ports are connected to such network nodes, which send group membership reports for the multicast group address configured for the cluster.

According to the IGMP protocol (Internet Group Management Protocol), network nodes send a group membership report when they join a multicast group to announce their presence to multicast routers. The report is sent with an IP destination address equal to the host group address being reported, so that the multicast router can recognize which multicast groups have members in its domain. A multicast router sends an IGMP query at regular intervals to see if any nodes belong to any multicast groups. Network nodes send a group membership report, when they receive a group membership query from the router. According to the invention, this mechanism is used to inform the switch about which ports are connected to cluster units. The IGMP protocol version 1 is defined in the IETF standard document RFC 1112, and IGMP version 2 is defined in the IETF proposed standard document RFC 2236.

BRIEF DESCRIPTION OF THE DRAWINGS

The invention is described in more detail in the following with reference to the accompanying drawings, of which

Same reference numerals are used for similar entities in the figures.

DETAILED DESCRIPTION OF THE PREFERRED EMBODIMENTS

A. A First Group of Advantageous Embodiments

Figure 1:
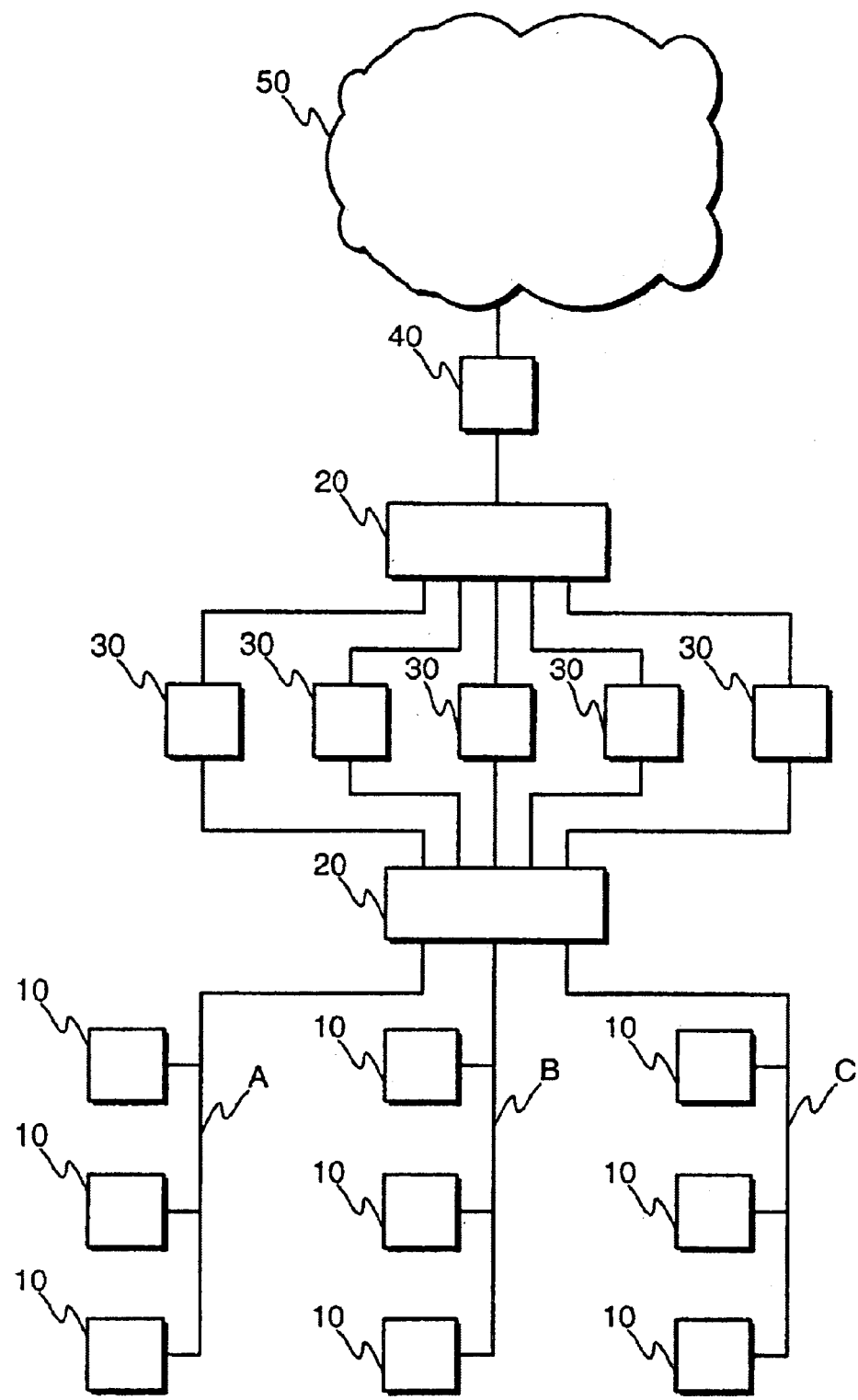
FIG. 1 illustrates a gateway cluster arrangement according to prior art.
Figure 2:
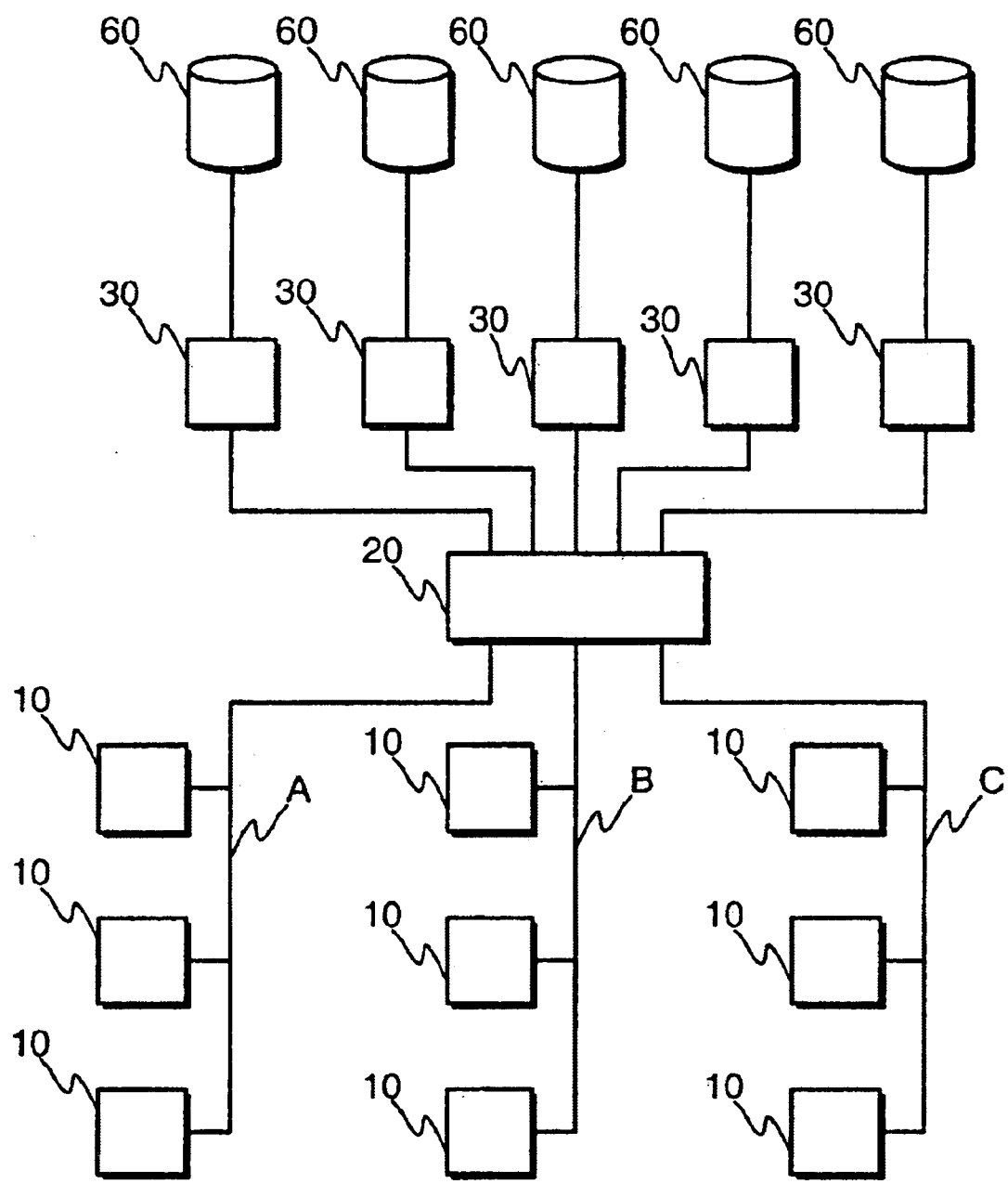
FIG. 2 illustrates a server cluster arrangement according to prior art.
Figure 3:
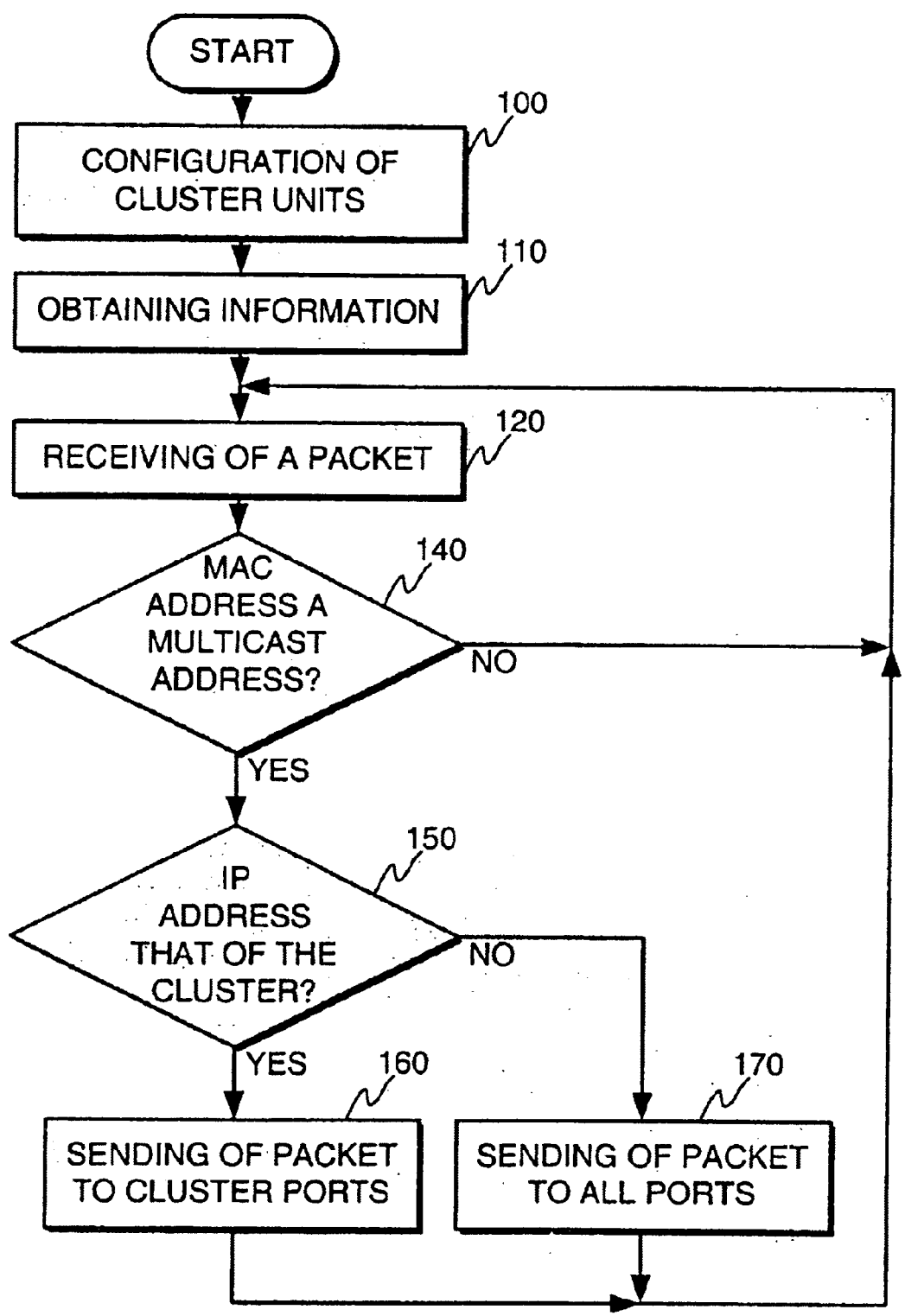
FIG. 3 illustrates a method according to an advantageous embodiment of the invention.

FIG. 3 illustrates a method according to an advantageous embodiment of the invention. FIG. 3 illustrates a method for transmission of data in an IP packet network, which network comprises a cluster of cluster units and a switching unit having a plurality of ports, and in which network the cluster units are connected to a part of the plurality of ports, and which cluster units share a unicast IP address.

According to the present embodiment, the method comprises at least steps, in which the cluster units are configured 100 to be members of an IP multicast group specific to the cluster, the IGMP protocol is used to obtain 110 information about to which ports of the plurality of ports the cluster units are connected, the MAC address of a received IP packet is checked in step 140, and if said MAC address is found to be a multicast MAC address, the IP destination address of said packet is compared 150 to the unicast IP address shared by the cluster units, if the IP destination address of said packet is the same as the unicast IP address, the packet is forwarded 160 to those ports, to which the cluster units were found to be connected, and if it is not, the packet is sent to all ports of the switch.

Figure 4:
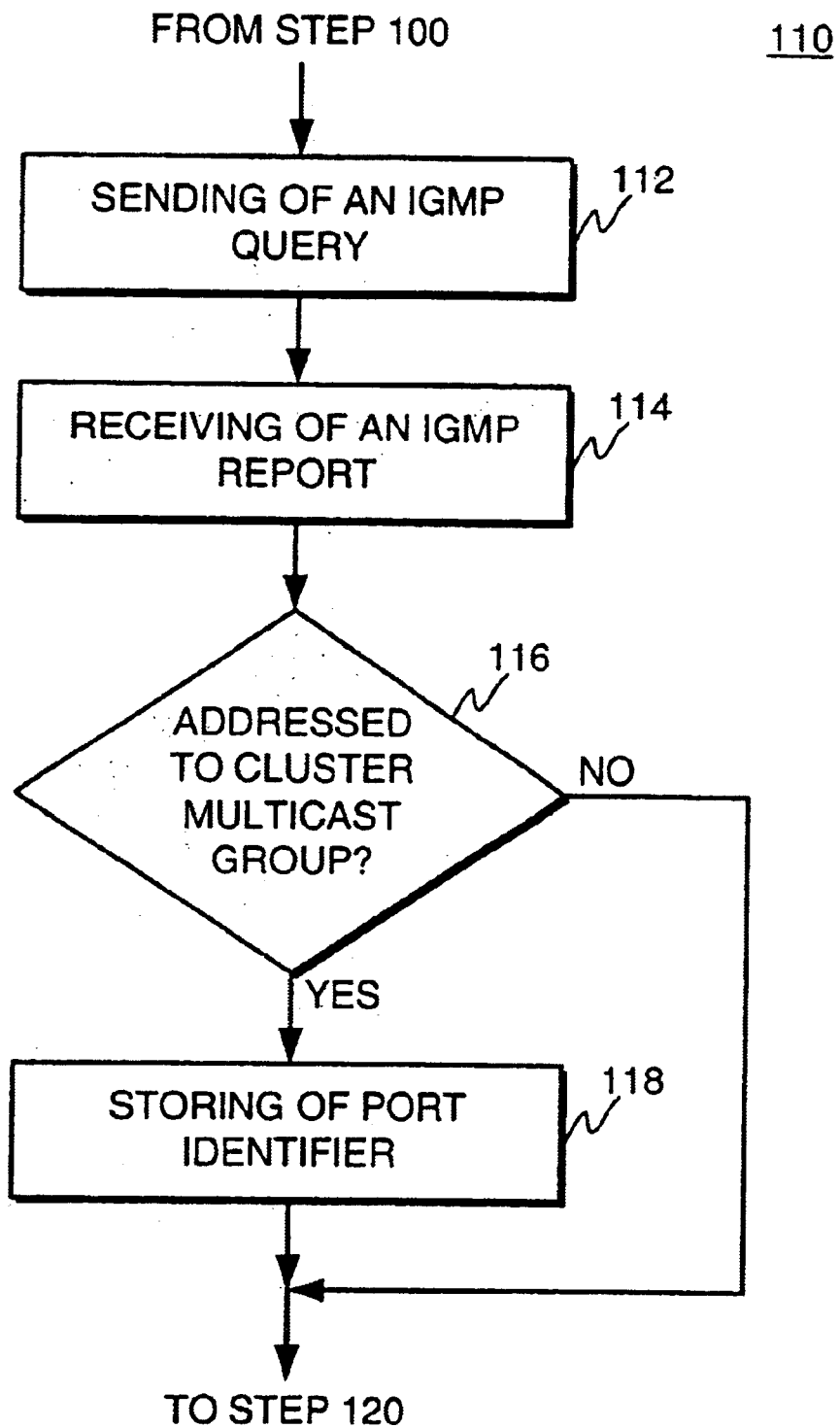
FIG. 4 illustrates another method according to an advantageous embodiment of the invention.

FIG. 4 illustrates as an example how the step 110 of obtaining By information is performed according to an advantageous embodiment of the invention. According to this embodiment, the method further comprises at least steps, in which the switching unit receives 114 an IGMP group membership report, the switching unit checks 116, if said report is addressed to said P specific to the cluster, and if it is, the switching unit stores 118 the identifier of the port, through which said report arrived.

Advantageously, the method may as well comprise a step, in which an IGMP group membership query is sent 112 by the switching unit.

In the inventive method, the IGMP protocol version 1 according to RFC 1112 can be used, as well as the IGMP protocol version 2 according to RFC 2236.

B. A Second Group of Advantageous Embodiments

Figure 5:
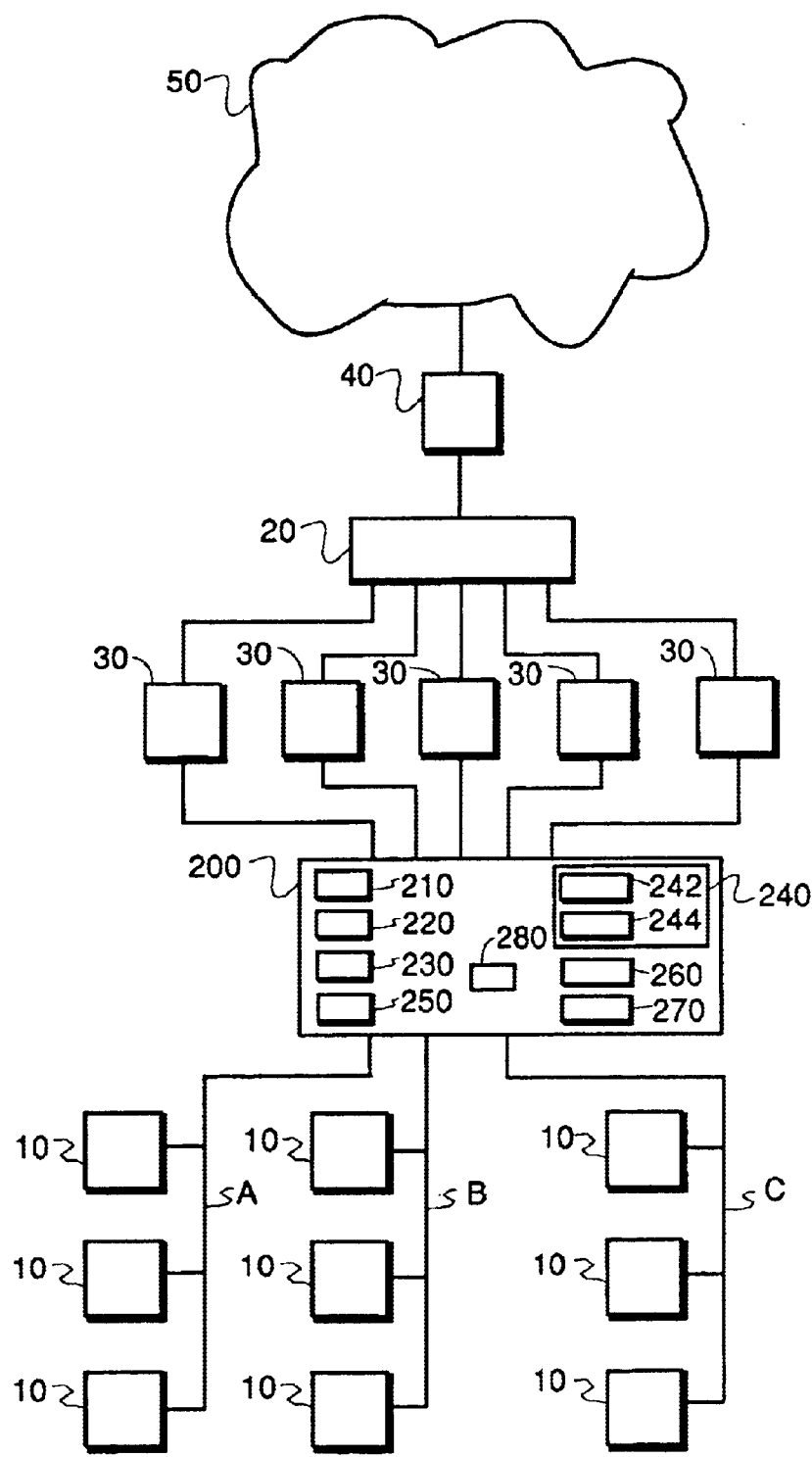
FIG. 5 illustrates a cluster system according to an advantageous embodiment of the invention.

FIG. 5 illustrates a cluster system according to an advantageous embodiment of the invention. FIG. 5 shows client computers 10 connected to a switch 200. The client computers 10, the switch 200, and form a local area network (LAN). The LAN is connected to an external network 50 through a gateway cluster consisting in this example of five gateways 30. The gateways 30 may for example function as firewall devices. The gateways 30 are connected to the external network 50 through a switch 200 and a router 40. The client computers are in FIG. 5 divided into three subnetworks A, B, and C. According to the embodiment shown in FIG. 5, the cluster system has a plurality of cluster units 30 and a switching unit 200, and said cluster units are associated with the same IP unicast address. According to the embodiment, the cluster units are configured to be members of an IP multicast group specific to the cluster system, and the cluster system comprises one or more software programs or dedicated logic circuits 240 for observing using the IGMP protocol which ports of the switching unit are connected to the cluster units, one or more software programs or dedicated logic circuits 210 in the switching unit for observing the MAC destination address of a packet arriving to the switching unit and for checking if said MAC destination address is a MAC multicast address, one or more software programs or dedicated logic circuits 220 in the switching unit for observing the IP destination address of said packet and for comparing said IP destination address to said IP unicast address associated with the cluster units, one or more software programs or dedicated logic circuits 230 in the switching unit for forwarding of the packet to those ports whose identifiers were previously stored to said memory as a response to the finding that said IP destination address and said IP unicast address are the same and said MAC destination address is a MAC multicast address.

In a further advantageous embodiment of the invention, one or more software programs or dedicated logic circuits 240 for observing using the IGMP protocol comprise at least
one or more software programs or dedicated logic circuits 242 in the switching unit for observing IGMP multicast group reports and for checking, if a received IGMP multicast group report is addressed to said IP multicast group specific to the cluster system, and
one or more software programs or dedicated logic circuits 244 in the switching unit for storing into a memory an identifier of that port via which said received IGMP multicast group report arrived as a response to finding that said report was addressed to said IP multicast group.

In a still further advantageous embodiment of the invention, the system further comprises one or more software programs or dedicated logic circuits 260 in the switching unit for sending IGMP group membership queries.

In an advantageous embodiment of the invention, one or more software programs or dedicated logic circuits 210, 220, 230, 240, 242, 244, 250, and 260 are realized using software programs stored in a memory element 270 of the switching unit 200 and executed by a processor 280 of the switching unit 200.

In another advantageous embodiment of the invention, said one or more software programs or dedicated logic circuits 210, 220, 230, 240, 242, 244, 250, and 260 are realized using dedicated logic circuits implemented for example using an ASIC circuit (application specific integrated circuit). Such an implementation of the invention allows the functioning of the switching unit at extremely high speeds.

In an advantageous embodiment of the invention, the cluster units 30 are gateway units 30.

In a further advantageous embodiment of the invention, the cluster units are server units.

C. Further Considerations

The invention has several advantages. For example, the invention enables connecting gateway clusters to switches, which allows the construction of high-speed networks using port-based virtual local area networks.

The invention is applicable with IPv4 as well as IPv6 networks. The IP protocol version 4 is described in detail in the specification RFC 791. The next version of the IP protocol, known as IPv6, is described in the specification RFC 1883.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

What is claimed is:

1. A method for transmission of data in an P packet network which comprises a cluster of cluster units, a switching unit having a plurality of ports, the cluster units being connected to a part of the plurality of ports, which cluster units share a unicast P address, said method comprising at least steps in which:
the cluster units are configured to be members of an P multicast group,
the IGMP protocol is used to obtain information about to which ports of the plurality of ports the cluster units are connected,
the MAC address of a received P packet is checked, and if said MAC address is a multicast MAC address, the P destination address of said packet is compared to the unicast P address shared by the cluster units,
if the P destination address of said packet is the same as the unicast P address, the packet is forwarded to those ports, to which the cluster units were found to be connected.

2. The method of claim 1, further comprising at least steps, in which:
the switching unit receives an IGMP group membership report,
the switching unit checks, if said report is addressed to said P multicast group specific to the cluster,
and if it is, the switching unit stores into its memory the identifier of the port, through which said report arrived.

3. The method of claim 1, further comprising a step, in which an IGMP group membership query is sent by the switching unit.

4. The method of claim 1, wherein the IGMP protocol is protocol version 1 according to RFC 1112.

5. The method of claim 1, wherein the IGMP protocol is protocol version 2 according to RFC 2236.

6. Cluster system having a plurality of cluster units and a switching unit, said cluster units being associated with the same P unicast address, wherein the cluster units are configured to be members of an P multicast group said cluster system comprising:
means for observing using the IGMP protocol which ports of the switching unit are connected to the cluster units,
means in the switching unit for observing the MAC destination address of a packet arriving to the switching unit and for checking if said MAC destination address is a MAC multicast address,
means in the switching unit for observing the P destination address of said packet and for comparing said P destination address to said P unicast address associated with the cluster units,
means in the switching unit for forwarding of the packet to those ports whose identifiers were previously stored to said memory means as a response to the finding that said P destination address and said P unicast address are the same and said MAC destination address is a MAC multicast address.

7. The system according to claim 6, wherein said means for observing using the IGMP protocol comprise at least:
means in the switching unit for observing IGMP multicast group reports and for checking, if a received IGMP multicast group report is addressed to said P multicast group specific to the cluster system, and
means in the switching unit for storing into a memory means an identifier of that port via which said received IGMP multicast group report arrived as a response to finding that said report was addressed to said IP multicast group.

8. The system according to claim 6, further comprising means in the switching unit for sending IGMP group membership queries.

9. The system according to claim 6, wherein the cluster units are gateway units.

10. The system according to claim 6, wherein the cluster units are server units.

11. Method for transmission of data in an P packet network, which comprises a cluster of cluster units, a switching unit having a plurality of ports, the cluster units being connected to a part of the plurality of ports, which cluster units share a unicast P address, said method comprising at least steps, in which the cluster units are configured to be members of an P multicast group, the IGMP protocol is used to obtain information about which ports of said plurality of ports of a switching unit to which said cluster units are connected, the MAC address of a received Ethernet frame containing an P packet is checked, and if said MAC address is the multicast MAC address shared by the cluster units, the frame is forwarded to those ports to which the cluster units were found to be connected.

12. The method of claim 11, further comprising a step, in which an IGMP group membership query is sent by the switching unit.

13. The method of claim 11, wherein the IGMP protocol is protocol version 1 according to RFC 1112.

14. The method of claim 11, wherein the IGMP protocol is protocol version 2 according to RFC 2236.

15. Cluster system having a plurality of cluster units and a switching unit, said cluster units being associated with the same P unicast address, wherein the cluster units are configured to be members of an P multicast group, said cluster system comprising means for observing, using the IGMP protocol, which ports of the switching unit are connected to said cluster units, means in the switching unit for observing the MAC destination address of a packet arriving at the switching unit and checking if said MAC destination address is a MAC multicast address, means in the switching unit for forwarding of the packet to those ports connected to the cluster units sharing a MAC multicast address.

16. The system according to claim 15, wherein said means for observing using the IGMP protocol comprise at least means in said switching unit for observing IGMP multicast group, and means in said switching unit for storing into a memory an identifier of that port via which said received IGMP multicast group report arrived as a response to finding that said report was addressed to said P multicast group.

17. The system according to claim 15, further comprising means in said switching unit for sending IGMP group membership queries.

18. The system according to claim 15, wherein said cluster units are gateway units.

19. The system according to claim 15, wherein said cluster units are server units.

20. A switching unit for cluster system having a plurality of cluster units, said cluster units being associated with the same P unicast address and configured to be members of an P multicast group specific to the cluster system, wherein said switching unit is structured as follows:

said switching system has circuitry or a programmed machine to observe, using the IGMP protocol, which ports of the switching unit are connected to the cluster units, the switching unit has circuitry or a programmed machine which observes the MAC destination address of a packet arriving at said switching unit and checks if said MAC destination address is a MAC multicast address, if so, the switching unit forwards the packet to those ports connected to the cluster units sharing a MAC multicast address.

21. A switching unit for cluster system having a plurality of cluster units, said cluster units being associated with the same P unicast address and configured to be members of an P multicast group specific to the cluster system, wherein said switching unit is structured as follows:

the switching unit includes a plurality of ports, said switching system includes a memory storing identifiers of those ports which, using an IGMP protocol, are determined to be connected to the cluster units, the switching unit has circuitry and/or a programmed machine to observe the MAC destination address of a packet arriving at the switching unit and check if said MAC destination address is a MAC multicast address, if so, the switching unit forwards the packet to those ports connected to the cluster units sharing a MAC multicast address.

22. A switching unit for cluster system having a plurality of cluster units, said cluster units being associated with the same P unicast address and configured to be members of an P multicast group specific to the cluster system, wherein said switching unit is structured as follows:

the switching unit includes a plurality of ports, said switching system includes a memory storing identifiers of those ports which, based on an IGMP multicast group reports received, are determined to be connected to the cluster units, the switching unit observes the MAC destination address of a packet arriving at said switching unit and checks if said MAC destination address is a MAC multicast address, if so, said switching unit forwards the packet to those ports connected to the cluster units sharing a MAC multicast address.

* * * * *